B. P. SAUNDERS & O. WILLIAMS.
VARIABLE SPEED GEARING FOR THE REELS OF AGRICULTURAL MACHINERY.
APPLICATION FILED SEPT. 9, 1912.
1,088,098.
Patented Feb. 24, 1914.
2 SHEETS—SHEET 2.
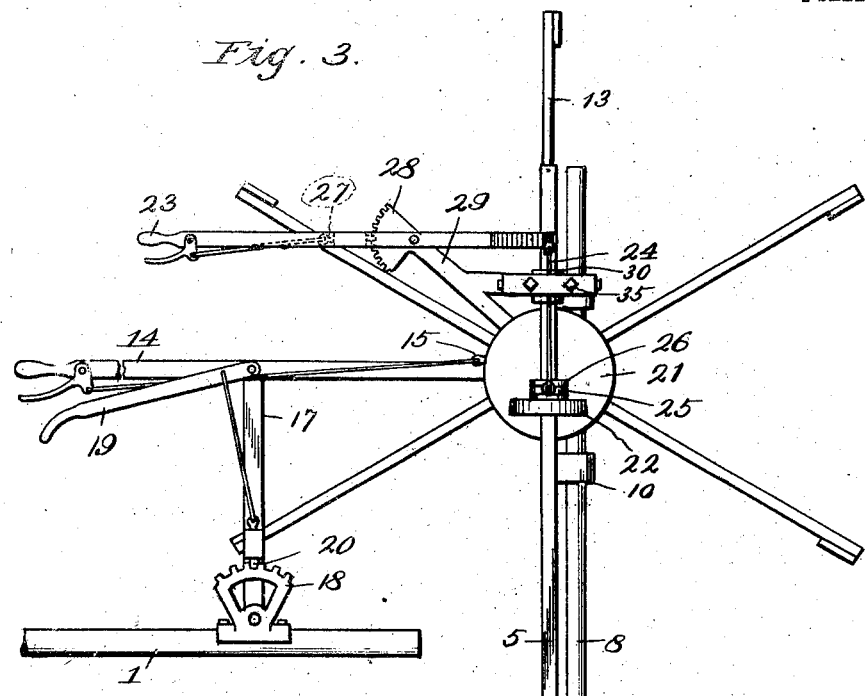
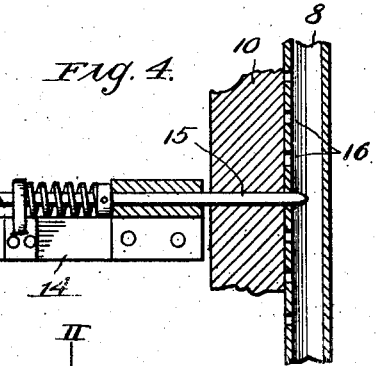
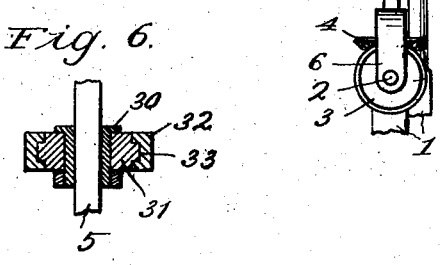
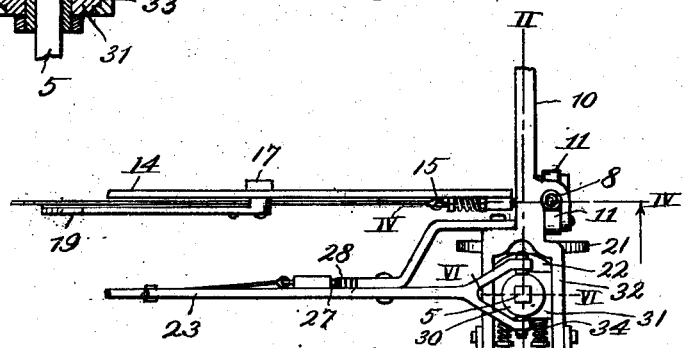
WITNESSES:
R. E. Hamilton
L. J. Fischer
INVENTORS:
Benjamin P. Saunders,
and Oscar Williams,
BY
F. G. Fischer,
ATTORNEY.

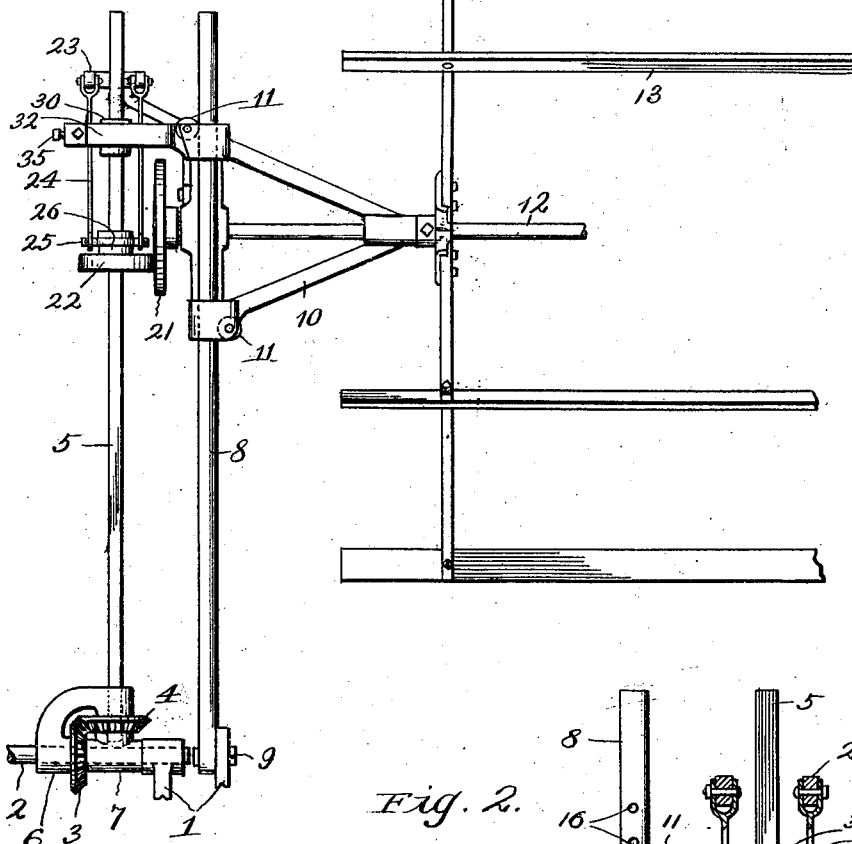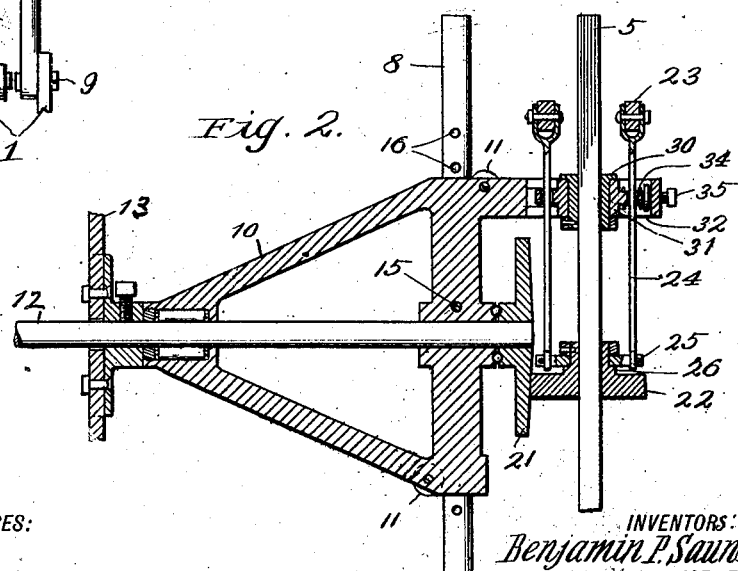

UNITED STATES PATENT OFFICE.

BENJAMIN P. SAUNDERS, OF IATAN, AND OSCAR WILLIAMS, OF WESTON, MISSOURI.

VARIABLE-SPEED GEARING FOR THE REELS OF AGRICULTURAL MACHINERY.

1,088,098.   Specification of Letters Patent.   Patented Feb. 24, 1914.

Application filed September 9, 1912. Serial No. 719,419.

*To all whom it may concern:*

Be it known that we, BENJAMIN P. SAUNDERS and OSCAR WILLIAMS, citizens of the United States, residing at Iatan and Weston, respectively, in the county of Platte and State of Missouri, have invented certain new and useful Improvements in Variable-Speed Gearing for the Reels of Agricultural Machinery, of which the following is a specification.

Our invention relates to a variable speed gearing for the reels of agricultural machinery, such as binders, headers, etc., and our principal object is to provide gearing whereby the speed of a reel may be readily varied at the will of an operator to suit the conditions of grain being cut.

Other objects of the invention will hereinafter appear, and in order that said invention may be readily understood reference will now be made to the accompanying drawings in which:

Figure 1 is a broken front elevation of a binder provided with our improvement. Fig. 2 is an enlarged section on line II—II of Fig. 5, showing our variable speed gearing and adjacent mechanism. Fig. 3 is a broken side elevation of a binder provided with our improvement. Fig. 4 is an enlarged broken section on line IV—IV of Fig. 5. Fig. 5 is a plan view of the mechanism with the reel removed. Fig. 6 is a section on line VI—VI of Fig. 5.

1 designates parts of a binder frame.

2 designates a shaft driven by any suitable part of the binder.

3 designates a bevel gear fixed upon shaft 2 and intermeshing with a bevel gear 4 fixed to the lower end of an upwardly-extending square shaft 5, journaled at its lower rounded end in two bearings 6 and 7 rockingly-mounted upon shaft 2, so that shaft 5 may swing forward and backward as will hereinafter appear.

8 designates a standard pivotally-secured upon frame 1 by a bolt 9 arranged in horizontal alinement with shaft 2, as shown on Fig. 1.

10 designates a bracket operably-mounted upon the standard 8, and provided with antifriction rollers 11 to reduce the friction incident to its travel on standard 8.

12 designates a horizontal shaft journaled in bracket 10 and carrying a reel 13, whereby the grain is held against the binder knives.

Bracket 10 is adjusted vertically on standard 8 by a hand-lever 14 for the purpose of raising the reel 13 to accommodate high grain, or to lower said reel to accommodate short grain, or grain that has been knocked down. Hand lever 14 is provided with a latch-pin 15 which extends through a hole in the adjacent portion of bracket 10 and is adapted to enter any one of a series of holes 16 in the standard to lock the bracket in any of its adjusted positions thereon. Lever 14 is fulcrumed upon an arm 17 pivotally-secured to a sector 18 rigidly-mounted upon a part of the binder frame 1. By adjusting said standard forward or backward the reel 13 is accordingly adjusted farther from or nearer to the binder knives to suit the condition of the grain being cut.

Pivotal-movement of arm 17 is controlled by a hand-lever 19 mounted upon the same fulcrum carrying hand-lever 14 and controlling a latch 20, fixed to arm 17 and coacting with the sector 18 in securing said arm in any of its adjusted positions.

The foregoing construction is in common use, the novelty of the invention residing in the mechanism which will now be described in detail.

21 designates a large friction-wheel fixedly mounted upon one end of the reel shaft 12 for the purpose of driving the same.

22 designates a small friction-wheel slidably-engaging one side of the large friction-wheel 21. Friction-wheel 22 rotates with shaft 5 but is slidable thereon, so that it may be adjusted radially of friction-wheel 21 for the purpose of driving the same at different speeds.

23 designates a hand-lever for adjusting the small friction-wheel 22 radially of the large friction-wheel 21. Lever 23 is bifurcated at its forward end, the terminals of its bifurcated portion being provided with pivotally-secured depending connecting-rods 24, carrying a collar 25 at their lower ends arranged in a peripheral groove in the hub 26 of the friction-wheel 22. Hand-lever 23 is locked in any of its adjusted positions by a latch 27 and a sector 28, which latter is carried by an arm 29 of the bracket 10.

The friction surface of wheel 21 is slightly conical, so that friction-wheel 22 will engage said friction surface with increasing pressure as it approaches the center thereof and thus prevent slippage from the increased resistance.

In order that the friction-wheel 22 may slide up and down on the conical surface of the friction-wheel 21, we mount the upper end of shaft 5 in a bearing 30, carried by a rectangular member 31 yieldingly-mounted in an arm 32 on the upper portion of bracket 10. Arm 32 is slotted, the opposite sides of its slotted portion having grooves 33 for member 31 to slide in, so that it cannot move either upward or downward independently of the bracket. Coil springs 34 bearing against member 31, push the same toward the friction-wheel 21, so that the same will be yieldingly-engaged by the small friction wheel 22. The tension of springs 34 is regulated by set-screws 35.

From the foregoing description it is obvious that the speed of the reel may be increased or diminished by adjusting friction-wheel 22 radially toward or away from the center of friction-wheel 21, and consequently grain can be saved which is now lost with a reel driven at constant speed.

Having thus described our invention what we claim and desire to secure by Letters Patent, is:

1. In combination with a reel and a driven shaft, a friction-wheel mounted upon the reel shaft, a friction-wheel mounted upon the driven shaft and engaging the first friction-wheel to drive the same, and means whereby one of said friction-wheels may be adjusted radially of the other friction-wheel to vary the speed of the reel shaft.

2. In combination with a reel and a driven shaft, a friction-wheel mounted upon the reel shaft, a friction-wheel mounted upon the driven shaft and engaging the first friction-wheel to drive the same, and hand-controlled means whereby one of said friction-wheels may be adjusted radially of the other friction-wheel to vary the speed of the reel shaft.

3. In combination with a reel and a driven shaft, a wheel mounted upon the reel shaft and having a conical friction-surface, a friction-wheel mounted upon the driven shaft and engaging said conical friction surface to drive the first friction-wheel, means tending to force the driven shaft toward the conical friction surface, and means whereby the second friction-wheel may be adjusted radially of the first friction-wheel to vary the speed of the reel shaft.

4. In combination with a reel and a driven shaft, a friction-wheel mounted upon the reel shaft, a friction-wheel mounted upon the driven shaft and engaging the first friction-wheel to drive the same, resilient means for holding the second friction-wheel in engagement with the first friction-wheel, and a hand-lever whereby the second friction-wheel may be adjusted radially of the first friction-wheel to vary the speed of the reel shaft.

5. In combination with a reel and a driven shaft, a friction-wheel mounted upon the reel shaft, a friction-wheel mounted upon the driven shaft and engaging the first friction-wheel to drive the same, a slidable member through which the driven shaft extends, means in which said slidable member is mounted, means tending to press said slidable member toward the first friction-wheel, and means whereby the second friction-wheel may be adjusted radially of the first friction-wheel to vary the speed of the reel shaft.

6. In combination with a reel and a driven shaft, a friction-wheel mounted upon the reel shaft, a friction-wheel mounted upon the driven shaft and engaging the first friction-wheel to drive the same, a slotted arm, a member slidable in said slotted arm and through which the driven shaft extends, a spring tending to press the slidable member toward the first friction-wheel, and means whereby the second friction-wheel may be adjusted radially of the first friction-wheel to vary the speed of the reel shaft.

7. The combination with a reel, a shaft fixed to said reel, a bracket in which said shaft is driven, and means for adjusting said bracket vertically and horizontally, of a friction-wheel fixedly mounted upon the reel shaft, a friction-wheel engaging the first friction-wheel to drive the same, means for driving the second friction-wheel, and means whereby the second friction-wheel may be adjusted radially of the first friction-wheel to vary the speed of the reel shaft.

In testimony whereof we affix our signatures, in the presence of two witnesses.

BENJAMIN P. SAUNDERS.
OSCAR WILLIAMS.

Witnesses:
L. R. PALMER,
P. KEMMERER.

---

Copies of this patent may be obtained for five cents each, by addressing the "Commissioner of Patents, Washington, D. C."